United States Patent [19]

Demarthe et al.

[11] 4,230,487

[45] Oct. 28, 1980

[54] METHOD OF SELECTIVELY BRINGING INTO SOLUTION THE NON-FERROUS METALS CONTAINED IN SULPHURIZED ORES AND CONCENTRATES

[75] Inventors: Jean-Michel Demarthe, Viroflay; Louis Gandon; André Georgeaux, both of Rambouillet, all of France

[73] Assignee: Societe Miniere et Metallurgique de Penarroya, Paris, France

[21] Appl. No.: 73,438

[22] Filed: Sep. 7, 1979

Related U.S. Application Data

[63] Continuation of Ser. No. 794,107, May 5, 1977, abandoned, which is a continuation-in-part of Ser. No. 577,772, May 15, 1975, abandoned.

[30] Foreign Application Priority Data

May 15, 1974 [FR] France .............................. 74 16773

[51] Int. Cl.$^2$ .................... C22B 13/04; C22B 15/08; C22B 19/22; C22B 23/04
[52] U.S. Cl. ...................... 75/101 R; 75/114; 75/117; 75/118 R; 75/119; 75/120; 75/121
[58] Field of Search ............... 75/101 R, 77, 104, 86, 75/117, 114, 118, 119, 120, 121; 204/107; 423/24, 27, 38, 94, 98, 100, 109, 150, 622

[56] References Cited

U.S. PATENT DOCUMENTS

| 695,126 | 3/1902 | Surinburne et al. | 75/77 X |
|---|---|---|---|
| 704,639 | 7/1902 | Hoepfner | 75/117 X |
| 1,539,711 | 5/1925 | Christensen | 75/77 X |
| 1,539,714 | 5/1925 | Christensen | 75/120 X |
| 3,637,372 | 1/1972 | Mayor et al. | 75/119 X |
| 3,785,944 | 1/1974 | Atwood et al. | 75/104 X |
| 3,839,168 | 10/1974 | Gandon et al. | 75/119 X |
| 3,849,121 | 11/1974 | Burrows | 75/103 |
| 3,896,208 | 7/1975 | Dubeck et al. | 75/117 X |
| 3,975,189 | 8/1976 | Haugen | 75/117 X |
| 3,998,628 | 12/1976 | Gandon et al. | 75/104 |

*Primary Examiner*—G. Ozaki
*Attorney, Agent, or Firm*—Fleit & Jacobson

[57] ABSTRACT

The invention provides a method for selectively solubilizing the non-ferrous metals contained in sulphurized ores and concentrates, with regard to the iron and sulphur therein, by subjecting the ore or concentrate to lixiviation with an aqueous solution of cupric chloride at a temperature above 50° C., preferably at a temperature between 70° C. and 105° C., and then regenerating said aqueous solution in situ at atmospheric pressure by means of air and a regeneration agent selected from the group consisting of hydrochloric acid and ferrous chloride. The invention also contemplates the preferable inclusion in the aqueous cupric chloride solution of an agent for solubilizing cuprous chloride selected from the group consisting of an alkali metal chloride, an alkaline earth metal chloride, ammonium chloride, and ferrous chloride. When the regeneration agent is hydrochloric acid, the pH of the aqueous cupric chloride solution is at most 1 in the presence of ferrous chloride and at most 3 in the absence of ferrous chloride. When the regeneration agent is ferrous chloride, the pH of the aqueous cupric chloride solution ranges between 1 and 3, the temperature of the solution exceeds 50° C., and the solution contains at least 1g/l of cuprous ions and at least 2g/l of ferrous ions, with the result that geothite is precipitated and may be separated, and the non-ferrous metals isolated as the aqueous solutions of the metal chlorides.

19 Claims, No Drawings

METHOD OF SELECTIVELY BRINGING INTO SOLUTION THE NON-FERROUS METALS CONTAINED IN SULPHURIZED ORES AND CONCENTRATES

This application is a continuation application of application Ser. No. 794,107, filed May 5, 1977, now abandoned which is a continuation-in-part of application bearing Ser. No. 577,772, filed May 15, 1975, now abandoned.

The present invention concerns a method for enabling copper, lead, zinc and associated precious metals contained in sulphurized ores and concentrates to be brought into solution selectively with regard to iron and sulphur.

Hydrometallurgical processes are known which enable such selective bringing into solution to be carried out; a method of this kind is described for example in Belgian Pat. No. 825,378, by the present inventors and entitled "Method for Selectively Bringing Into Solution the Non-Ferrous Metals Contained in Pyritic Ores". Although this process constitutes a certain advance beyond the prior art, it nevertheless suffers from a certain number of drawbacks among which might be mentioned the fact that it is not selective as regards iron if the latter is present in the form of pyrites. Furthermore this process calls for the use of gaseous chlorine, the use and recovery of which constitute delicate operations.

One of the objects of the present invention is to provide a method of this kind that does not suffer from these disadvantages.

A further object of the invention is to provide specialists in the field with such a method which can be used on a large number of sulphurized ores and concentrates as detailed below.

The method of the invention is concerned in particular with sulphurized ores which contain non-ferrous metals in the form of sulphide or thioantimonide or very finely crystallized thioarsenide so that it is difficult if not impossible to concentrate them by flotation even of the entire ore. These ores are not exploited, apart from the production of sulphuric acid, although they constitute considerable reserves of nonferrous metal.

A further field of application of the present invention is that of the treatment of all the concentrates containing simultaneously galenite, blende and chalcopyrite, as well as a considerable quantity of pyrites.

This type of concentrate is not capable of treatment by the conventional metallurgical processes used for copper, lead and zinc.

It is in fact often impossible to achieve differential flotation giving correct yields, as such flotation necessitates complex and expensive systems of metallurgical treatment. In this case, entire concentration of the non-ferrous metals by flotation may often still be envisageable and may lead to good yields in the recovery of the metals. However, this possibility is not often exploited because of the almost insurmountable difficulties implicit in the subsequent treatment of this type of concentrate using conventional metallurgical processes.

It is also possible to envisage the treatment of ores and concentrates of copper, zinc and lead, rich in iron and obtained by differential flotation, which have hitherto not been capable of processing by the conventional metallurgical methods. It is clear that the normal concentrates of blende, galenite and chalcopyrite are in particular perfectly suited for treatment by the method in accordance with the invention.

An object of the invention is to provide a method for bringing the above-mentioned metals into solution on a selective basis which is only very slightly affected by the iron and silicon contents of the initial product.

A further object of the invention is to provide such a method which, in contrast to that described in the abovementioned Belgian patent, does not require the use of gaseous chlorine for its operation.

The main aim of the present invention is to provide a method for selectively bringing into solution said metals which enables all of these ores to be treated and which optionally uses a preliminary flotation stage, this method leading to the provision of an aqueous solution which contains the non-ferrous metals included in the initial product, without the pyrites and the sulphur being attacked to any appreciable extent, whereas the iron associated with ores other than pyrites is separated in the form of goethite which can be readily filtered.

Another aim of the invention is to provide a method of this kind that is applicable to sulphurized concentrates obtained as a result of a preliminary pyrometallurgical treatment of sulphurized or oxidized ores such as lead and copper mattes, speiss, nickel mattes, etc.

According to the invention, these objects and others that will appear hereinafter are achieved by means of a method of the kind described above, in which the initial product is subjected to lixiviation by means of an aqueous cupric chloride solution and the cupric chloride is regenerated in situ by means of a regeneration agent and air at atmospheric pressure.

Preferably, said aqueous cupric chloride solution also contains an agent for solubilizing cuprous chloride, which agent is selected from the group comprising alkali metal chlorides, alkaline earth metal chlorides, ammonium chloride and ferrous chloride.

The regeneration agent specified above which is always used in conjunction with air at atmospheric pressure may be hydrochloric acid or ferrous chloride, one or both of the two methods of regenerating cupric chloride being used, depending upon the ores to be treated and the objects in mind. In the case where regeneration is carried out by hydrochloric acid and air, the pH-value is preferably at most 1 when ferrous chloride is present, and at most 3 when ferrous chloride is not present. In the case where regeneration is carried out by means of ferrous chloride and air, the pH-value is advantageously between 1 and 3. The regeneration temperature is above 50° C. and, preferably, is the same as the lixiviation temperature.

In this connection, it should be pointed out that if the cuprous chloride is regenerated by a mixture of ferrous chloride and air, the method in accordance with the invention makes it possible to eliminate the iron contained in the solution in the form of a hydroxide which can be easily filtered and is generally known under the name goethite.

The present method of selective dissolution is advantageously carried out at a temperature above the ambient temperature, and by controlling the oxido-reduction potential of the lixiviation solution, which potential is preferably between 400 and 800 millivolts. The value to be used for each of the various operating parameters will depend to a large extent upon the initial product to be treated and upon the precise objectives of the operation. Thus, it may be required to bring into solution a maximum quantity of non-ferrous metals thereby permitting some of the sulphur and pyrites also to take part in the reaction. Conversely, it may be that a lower yield of dissolved non-ferrous metals is acceptable in order to impose a strict limit upon the quantities of sulphur and pyrites also dissolved. It will be obvious that these two initial choices will determine the various operating parameters, but specialists in this field will readily be able to determine those parameters that it is best to adopt, since detailed explanations regarding those parameters are provided below.

When the initial product is a sulfurized ore or concentrate containing lead sulphide, the lixiviation thereof, with the aqueous solution containing cupric chloride and the agent for solubilizing cuprous chloride, converts the lead sulphide to the soluble lead chloride which may thereafter be isolated and the lead recovered therefrom, if desired. Thus, for example, the lead chloride may be crystallized, as, for instance, by cooling the aqueous solution containing the soluble metal chlorides, the crystallized lead chloride reduced to obtain elemental lead and a regenerating agent as a by-product, and the regenerating agent recycled to the lixiviating step. The reduction may be accomplished by hydrogen with the lead chloride in the liquid (molten) phase, according to the teachings of French Pat. Nos. 2,271,298 and 2,365,636, both of which are assigned to the "SOCIETE MINIERE ET METALLURGIQUE de PENNAROYA". The reduction may also be performed in the gaseous phase according to the well-known technique of Van Arkel or the technique of Jellinek and Rudat (Z. physik. Chem., Vol. 143, pp. 244–264, 1929). In addition to the foregoing, other methods of recovering the lead from the crystallized lead chloride may be utilized. For example, one such method involves the cementation of the crystallized lead chloride by metallic iron to obtain elemental lead and ferrous chloride, the latter being recycled as a regenerating agent to the lixiviating step. Another such method involves the cementation of the crystallized lead chloride with metallic zinc to obtain elemental lead and zinc chloride, followed by pyrohydrolysis of the zinc chloride to produce hydrochloric acid which can be recycled as regenerating agent to the lixiviating step, and zinc oxide which can be recovered as such or dissolved in sulphuric acid to yield zinc sulphate which, in turn, can be electrolyzed to produce metallic zinc and regenerate the sulphuric acid.

The following description, by which the invention is in no way limited, will clearly show how the present invention may be practised.

A. Dissolution Stage Proper

The ore or the initial concentrate is crushed and is introduced while being stirred, and at a temperature above ambient temperature, into one of the compartments of a reaction vessel containing a solution of cuprous and cupric chlorides.

The lixiviation solution also contains an agent for solubilizing cuprous chloride and selected from the group comprising alkali metal chlorides, alkaline earth metal chlorides, ammonium chloride and ferrous chloride. It will be obvious that when carrying out the method on an industrial basis an inexpensive chloride such as sodium chloride in a concentration varying from 100 to 250 g/l will be selected, but the choice will obviously vary depending upon the prime material that is being treated and the objectives in mind.

In this part of the lixiviation reaction vessel, the sulphides of the non-ferrous materials contained in the ore or the initial concentrate are converted into the chlorides of the respective metals, but cupric chloride is reduced to cuprous chloride. The latter remains in solution because of the presence of the solubilizing agent and, on the other hand, elemental sulphur is obtained.

It should be noted that henceforward, bearing in mind the mechanism of the reaction, the oxido-reduction potential of the solution cannot be greater than that of a cupric chloride solution containing no cuprous chloride, that is to say 800 millivolts, the potential of a hydrogen electrode being taken as a reference.

EXAMPLE 1

This example concerns the reaction of cupric chloride with a complex pyritic lead and zinc ore obtained from the MacArthur River deposits in Australia. This ore which is rich in zinc and lead lends itself poorly to treatment by the differential flotation techniques which would enable marketable concentrates of lead and zinc to be obtained. Its approximate composition is as follows:

Zn = 10.8%
Pb = 4.29%
Fe = 9.7%
$S^o$ = 15%

The reaction was carried out in two stages. In the first, the fresh ore was lixiviated by a solution containing 40 g/l of cupric ions and 250 g/l of sodium chloride. In the second stage, the residue from the first reaction was put into a fresh solution of the same composition. In each reaction, the quantity of solution introduced was 1.1 S.Q. as related to the initial quantity of lead and zinc, the letters S.Q., of course, indicating the quantity that would be stoichiometrically necessary, taking into account the chemical reactions. On completion of the operations, the residue was washed and repulped in 410 ml of hot water. The various solutions obtained were analyzed and used for estimating the dissolution yields of the main metals contained in the ore. The results are shown in the following table.

| Compositions (% or g/l) | Zn | Pb | Ag | Cd | Fe |
|---|---|---|---|---|---|
| Initial ore solution | 10.8% | 4.29% | 44 g/t | 0.03% | 9.7% |
| Composition after 1st reaction | 8.65 $gl^{-1}$ | 7.6 $gl^{-1}$ | 4.86 $mgl^{-1}$ | 26 $mgl^{-1}$ | 2.9 $mgl^{-1}$ |
| Dissolution yield after 1st reaction | 45% | 92% | 62% | 50% | 0.02% |
| Solution after 2nd reaction | 8.95 $gl^{-1}$ | 0.87 $gl^{-1}$ | 2.2 $mgl^{-1}$ | 25 $mgl^{-1}$ | 22 $mgl^{-1}$ |
| Washing of final residue | 1.73 $gl^{-1}$ | 61 $mgl^{-1}$ | | | 3.2 $mgl^{-1}$ |

-continued

| Compositions (% or g/l) | Zn | Pb | Ag | Cd | Fe |
|---|---|---|---|---|---|
| Final residue | 0.84% | 0.18% | 6 g/t | 30 g/t | 12% |
| Total yield | 94% | 97% | 89% | 92% | 0.04% |

It will be seen that the yields from the dissolution of the non-ferrous materials are all above 90%, and even 97% in the case of lead. On the other hand, only a very small amount of iron passes into solution, and this illustrates the selective nature of the method of the invention.

B. Regeneration of Cupric Chloride with Hydrochloric Acid and Air

In this first procedure, the solution resulting from the lixiviation stage proper is passed into another part of the same reaction vessel where air at atmospheric pressure and hydrochloric acid are added while the mixture is being stirred. The cupric chloride is then regenerated in situ and may be used again for lixiviation.

Before specifying the operating conditions to be used, it might be pointed out that the two stages of the method can be carried out either in two compartments of the same reaction vessel or in a single reaction vessel.

It has already been stated above that the various operating parameters should be selected as a function of the nature of the ore or of the sulphurized concentrate to be treated as well as of the objectives in mind. Consequently, the system whereby it is necessary to determine the physicochemical conditions in the lixiviation reaction vessel, i.e., principally the pH-value of the solution and its oxido-reduction potential, and the method of selecting the composition and volume of the initial lixiviation solution will also be dealt with.

When the regeneration stage takes place, the oxidation reactions that occur show that a quantity of hydrochloric acid theoretically necessary, or the stoichiometric quantity S.Q. depends upon the ore that is being treated. The quantity that will be used in practice depends upon the procedure used, but it can be stated that it should be in the approximate range of 1 to 1.05 S.Q.

As regards the pH-value of the solution, this should be maintained at a value less than 1 when the solution contains iron in the ferrous state, and at a value less than 3 if it does not. This pH-value can be adjusted very simply by varying the rate of delivery of the air and/or hydrochloric acid injected into the reaction vessel.

Regarding the oxido-reduction potential of the solution, this should be between 400 and 800 millivolts as stated above. The precise choice of the potential in this range depends to a large extent upon the nature of the sulphurized product that is to be treated. Thus, by using a potential in the neighborhood of 400 millivolts, it is possible to achieve very great selectivity in the dissolution of the non-ferrous metals with respect to sulphur and iron. This first type of adjustment is particularly important when the sulphides of the non-ferrous metals in question are very reactive with respect to cupric chloride. It is then unnecessary, for obtaining a good dissolution yield and good selectivity, to operate at a high potential. When the product is less reactive, it may be that despite everything, a potential in the region of 400 millivolts should be maintained if the main objective is selectivity rather than yield. Most frequently the potential will then be increased to a value in the region of 700 millivolts in order to maintain a very high yield at the expense of dissolving a little more iron and sulphur.

Preferably this potential is kept at a substantially constant value by adjusting the rate of delivery of the air injected into the reaction vessel.

The reaction temperature should be higher than 50° C. and is preferably between 70° and 105° C. As for pressure, all the lixiviation operations can be carried out at atmospheric pressure and this represents an advantage of the method of the invention as stated above.

The operating conditions in the reaction vessel having thus been defined, details will now be given of the composition of the initial lixiviation solution, as well as of the volume used for dissolving a given quantity of non-ferrous metals.

In the first place, as stated previously, in order to increase the solubility of the cuprous chloride that is formed, it is preferable that the solution contain a chloride which may be either ferrous chloride or the chloride of an alkali metal or alkaline earth metal or ammonium chloride. When sodium chloride is selected, its concentration, as mentioned previously, should be in the order of 100 to 250 g/l.

The initial cupric chloride concentration is determined only by the need for carrying out the reaction rapidly. The method of the invention in fact offers the advantage of enabling use to be made of solutions in which the ratio of the weight of copper to that of all the useful materials in the product to be treated is low, this being possible because the cuprous chloride is oxidized with hydrochloric acid and air as it forms. It will be clear however, that if the initial solution does not contain copper, the oxidation mechanism by means of the cuprous chloride/cupric chloride couple would take a long time to be established. By way of example and without imposing a limit on the use of the method, it is preferable to use a copper concentration in excess of 5 g/l.

The choice of the initial copper concentration also depends upon the objectives in mind, an advantageous range being between 10 and 50 g/l.

The volume of the solution to be used is determined by considerations of a physico-chemical nature. The pulp obtained in the reaction vessel should not contain more than 30% by volume of solids, and this, taking into account the nature of the ore or concentrate to be treated, determines the ratio of the volume of the solution to the weight of useful metals. Thus, when treating an ore having low copper, lead and zinc contents, this ratio will be increased; on the other hand it will be considerably lower in the case of a concentrate.

EXAMPLE 2

This example concerns the reaction of blende with hydrochloric acid and air in the presence of cupric chloride, the lixiviation reaction vessel and the oxidation vessel being separated by a decanter. The apparatus was initially filled with 3.260 ml of reaction solution, i.e., 1.6 l in the lixiviation reaction vessel and 1 l in the oxidation reaction vessel, the remainder being in the decanter. This solution had the following composition:

$Cu^{++} = 15$ g/l (in the form of $CuCl_2$)
$NaCl = 120$ g/l

The solution in the lixiviation reaction vessel was brought to boiling point, that is to say to a temperature of 103° C., whereas the solution contained in the oxidation reaction vessel was raised to a temperature of 80° C. Then, at zero time, 100 g of blende were introduced into the lixiviation reaction vessel, this ore being from Saint-Salvy (France), and having the following composition:

Zn=54.7%
S=31.4%

The solution emerging from the oxidation reaction vessel and passing to the lixiviation reaction vessel circulated at a rate of 1.5 l/h, whereas the rate at which the overflow from the decanter to the lixiviation reaction vessel was recycled was 0.5 l/h. Oxygen was introduced into the oxidation reaction vessel at a rate of 160 l/h. 6 N hydrochloric acid was also introduced into this latter reaction vessel at a rate dependent upon the pH-value. The treatment lasted 16 hours, during which time the change in the $Cu^+$ ion content and in the potential in the lixiviation reaction vessel and the oxidation reaction vessel was determined. At the end of 16 hours, 260 ml of hydrochloric acid solution has been added, and 37.0 g of residue from the initial reaction and containing 2.7% of zinc was obtained. The zinc yield from the operation was therefore 98.1%.

EXAMPLE 3

The example relates to the reaction of blende and hydrochloric acid and air in the presence of cupric chloride, the lixiviation and oxidation reactions being carried out in the same reaction vessel.

This test was carried out in a cylindrical reaction vessel which was agitated and the base of which consisted of a porous plate made of fritted glass. At zero time, this reaction vessel was charged with a liter of initial reaction solution and 30 g of blende. The solution and the blende had the following compositions:

| Initial reaction solution | $Cu^{++}$ = 15 g/l (in the form of $CuCl_2$) |
|---|---|
| Blende | NaCl = 120 g/l<br>Zn = 54.8%<br>S = 31.4% |

The temperature in the reaction vessel was kept at 90° C., and the pH-value was kept at a constant value of 1.5 by the automatic addition of approximately 6 N hydrochloric acid.

After 5 hours 35 minutes, 52 ml of hydrochloric acid had been added and there were obtained 17 g of residue containing 36% of zinc. The yield of zinc in solution was therefore 62.7%.

EXAMPLE 4

This example is similar to the previous one as regards procedure, but the product treated was a lead and copper matte which was a side-product from the lead works of Noyelles-Godault (France) and which came from a workshop in which copper was partially removed from the lead, said side-product containing approximately 44.5% of copper, 37.1% of lead and 16.5% of sulphur.

The reaction vessel was charged at zero time with a liter of lixiviation reaction solution containing 30 g/l of cupric ions in the form of $CuCl_2$ and 220 g/l of sodium chloride. 80 g of lead and copper matte were also introduced into the reaction vessel and a temperature of 85° C. was maintained for 5 hours, the pH-value being held at 2.0 by adding approximately 12 N hydrochloric acid. Air was introduced into the reaction vessel at a rate of 200 l/h approximately.

Measurements carried out during the reaction verified the efficacy of the oxidation of the cuprous ion by hydrochloric acic and air. The operation was brought to an end after 4 hours and the solution was filtered, and the residue from the reaction was washed with an acidulated solution of sodium chloride in an amount of 270 g/l to eliminate the lead chloride that had not been totally solubilized.

Finally, 12 g of residue containing 0.35% of copper and 0.38% of lead were recovered. The yeild from the operation was therefore:

99.9% for copper
99.8% for lead

EXAMPLE 5

This example relates to the lixiviation reaction of solid pyrites and hydrochloric acid and air, this lixiviation being carried out in a single compartment.

The test was carried out by stirring the mixture in a cylindrical reaction vessel, the base of which was formed by a porous plate of fritted glass. At zero time, a liter of prime reaction solution and 270 g of solid pyrites were introduced into the reaction vessel. The solution contained 15 g/l of cupric ions in the form of cupric chloride, and 120 g/l of sodium chloride. The solid pyrites used came from Huelva (Spain) and had the following compositions:

Zn=4.25%
S=45% approximately
Fe=40% approximately (pyrites)

This material is difficult to concentrate by flotation on account of its fine degree of crystallization.

The temperature in the reaction vessel was maintained at 90° C., and the pH-value was held at 2.0 by the automatic addition of approximately 6 N hydrochloric acid. The air was introduced through the porous plate at a rate of 160 l/h.

The treatment was carried out for 5 hours 10 minutes, and during this time 46.8 ml of hydrochloric acid were poured in.

Upon completion of the reaction 288 g of wet residue were recovered. After washing with water, this residue contained 0.55% of zinc. The yield of zinc from this reaction was therefore 86.1%.

EXAMPLE 6

This example concerns the reaction of a complete flotation concentrate of the ore from the MacArthur River (Australia) and hydrochloric acid and air, the lixiviation reaction and oxidation reaction being carried out while stirring the mixture in the same cylindrical reaction vessel having a porous plate at its base.

At zero time, one liter of lixiviation reaction solution and 50 g of concentrate were introduced into the reaction vessel. The solution contained 15 g/l of cupric ions in the form of chloride, and 120 g/l of sodium chloride. The concentrate had the following composition:

Zn=21.7%
Pb=9.08%
Fe=12.2%

The temperature in the reaction vessel was maintained at 90° C. Air penetrated right into the liquid through the porous plate and was admitted at a rate of 160 l/h.

During the reaction, the changes in potential and the cuprous ion content of the solution were observed. The presence of a large quantity of cuprous ions would have indicated insufficient oxidation which would have necessitated an increase in the rate of delivery of the air.

The operation was brought to an end after an hour. At this point, 62 ml of approximately 6 HCl had been poured in. At the end of the operation, 40 g of wet residue were recovered and washed in water; it contained:
0.96% of lead
0.85% of zinc
The yields from the operation were therefore:
for Pb: 91.6%
for Zn: 96.9%

It will be seen that these excellent yields were obtained very rapidly and this is advantageous from the point of view of economics.

C. Regeneration of Cupric Chloride by Ferrous Chloride and Air

The method of regeneration of the cupric chloride by ferrous chloride and air at atmospheric pressure, already mentioned above, offers the additional advantage of providing an overall lixiviation procedure which is completely selective as regards iron, since this metal, which would not have been eliminated selectively in the form of unreacted pyrites, would be so in the form of goethite after an intermediate step involving the solubilization of ferrous chloride.

Depending upon the type of products to be treated, this stage for the regeneration of cupric chloride by oxidation of the iron can be used in combination with the preceding regeneration procedure or it may completely replace the latter.

To carry out this stage, part of the solution used for lixiviation and therefore containing cupric chloride and ferrous chloride if lixiviation was not perfectly selective, is introduced into another compartment of reaction vessel. The iron is oxidized to form goethite in this other compartment after the liquid and solid phases had of course been separated from each other to eliminate the unreacted residue and the elementary sulphur resulting from the lixiviation treatment.

In this part of the regeneration procedure wherein the cuprous chloride is oxidized to form cupric chloride, and the ferrous chloride is oxidized to form goethite, FeO(OH), the operating conditions have to be maintained in a precise manner especially as regards the pH-value.

In particular, it is not possible to oxidize ferrous iron at atmospheric pressure to produce goethite if the acidity occurring during the reactions is not continuously neutralized. This neutralization can be achieved very simply within the framework of the method of the invention because of the particular conditions that exist. It is in fact sufficient to inject surplus air into the reaction medium to offset the acidity that occurs and thus to achieve an iron hydrolysis reaction and regeneration of the cupric chloride. This reaction can be carried out very readily at atmospheric pressure when the pH-value is between 1 and 3.

From this point of view, it is advantageous for the solution emerging from the reaction vessel for recycling to the lixiviation stage proper to contain at least 1 g/l of cuprous ions and 2 g/l of ferrous ions so that the pH-value remains respectively greater than 1 and less than 3.

As regards temperature, numerous tests carried out by the inventors have shown that this should be above 90° C. so that the geothite pulp obtained possesses good filtering properties.

It is, of course, sufficient to treat, at this stage, only a part of the total volume used during lixiviation. The precise quantity will be determined as a function of the selectivity of the lixiviation in regard to iron and of the requirements resulting from the separation and purification stages used in conjunction with lixiviation.

EXAMPLE 7

This example is concerned with the precipitation of goethite from a mixture of cuprous chloride and ferrous chloride, the latter being the agent for solubilizing the cuprous chloride.

This solution is representative of the solution obtained by lixiviation of a sulphurized concentrate with cupric chloride.

A liter of solution having the following composition:
$Cu^+$: 33.0 g/l (in the form of CuCl)
$Fe^{++}$: 162 g/l (in the form of $FeCl_2$)
was introduced into a reaction vessel, the base of which constituted a porous plate.

After the temperature had been raised to 95° C.±2° C., compressed air was introduced at a rate of approximately 160 l/h.

On completion of the treatment, the solution was filtered and the insoluble constituent was dried. In this way, there were recovered 34 g of hydrated iron oxide having the following composition:
Cu: 2.65%
Fe: 46.6%

This result shows that in a solution containing cuprous chloride dissolved in ferrous chloride it is possible to eliminate selectively part of the iron in the form of hydrated iron oxide.

Also, the cuprous ion concentration of the solution was measured at the beginning and end of the test. This concentration changed from 33 g/l to 8.0 g/l, which proves that a considerable part of the cupric ions has been regenerated during elimination of the iron.

We claim:
1. A method for selectively solubilizing at least one non-ferrous metal selected from the group consisting of lead, zinc, copper, silver, cadmium, nickel, and cobalt, and contained, in the form of its sulphide, in an initial product selected from the group consisting of sulphurized ores and concentrates, comprising subjecting said initial product to lixiviation at a temperature above 50° C. with an aqueous solution containing cupric chloride and an agent for solubilizing cuprous chloride, the aqueous solution having an oxido-reduction potential of between 400 and 800 millivolts in relation to a hydrogen electrode potential throughout the operation, whereby the metal sulphides are converted to the respective soluble metal chlorides, the cupric chloride is reduced to cuprous chloride which remains in solution due to said solubilizing agent, and elemental sulfur is produced, and regenerating the resulting reaction mixture in situ at atmospheric pressure and at a temperature above 50° C. with air and hydrochloric acid while maintaining the pH of the solution at a value of at most 1 when the solution contains ferrous chloride and at a value of at most 3 when ferrous chloride is absent, whereby the cuprous chloride is oxidized to cupric chloride, and isolating an aqueous solution containing said at least one non-ferrous metal chloride.

2. The method of claim 1 wherein the lixiviation is carried out at a temperature between 70° C. and 105° C.

3. The method of claim 1 wherein the elemental sulfur and any unreacted residue are separated from the reaction mixture before regenerating the resulting solution.

4. The method of claim 1 wherein the pH is maintained by controlling the rate of addition of the hydrochloric acid.

5. The method of claim 1 wherein the oxido-reduction potential is maintained by controlling the rate of delivery of the air.

6. The method of claim 1 wherein the agent for solubilizing cuprous chloride comprises a chloride ion.

7. The method of claim 1 wherein the agent for solubilizing cuprous chloride is selected from the group consisting of an alkali metal chloride, an alkaline earth metal chloride, ammonium chloride, and ferrous chloride.

8. The method of claim 1 wherein the initial product contains lead sulphide which is converted to the soluble lead chloride by the lixiviation and is present as such in the isolated aqueous solution containing at least one non-ferrous metal chloride, crystallizing the lead chloride, separating the crystallized lead chloride from the aqueous solution, and recovering the lead from the crystallized lead chloride.

9. The method of claim 8 wherein the lead is recovered by reducing the crystallized lead chloride to obtain elemental lead and a regenerating agent as a byproduct which is recycled to the lixiviating step.

10. The method of claim 8 wherein the lead is recovered by cementing the crystallized lead chloride with metallic iron to obtain elemental lead and ferrous chloride which is recycled as a regenerating agent to the lixiviating step.

11. The method of claim 1 wherein the non-ferrous metal is selected from the group consisting of zinc, copper and lead; the lixiviation is carried out at a temperature between 85° and 103° C.; the agent for solubilizing cuprous chloride is sodium chloride; and the regeneration is carried out at a temperature of from 80° to 90° C.

12. A method for selectively solubilizing at least one non-ferrous metal selected from the group consisting of lead, zinc, copper, silver, cadmium, nickel, and cobalt, and contained, in the form of its sulphide, in an initial product selected from the group consisting of sulphurized ores and concentrates, comprising subjecting said initial product to lixiviation at a temperature above 50° C. with an aqueous solution containing cupric chloride and an agent for solubilizing cuprous chloride, the aqueous solution having an oxido-reduction potential of between 400 and 800 millivolts in relation to a hydrogen electrode potential throughout the operation, whereby the metal sulphides are converted to the respective soluble metal chlorides, the cupric chloride is reduced to cuprous chloride which remains in solution due to said solubilizing agent, and elemental sulphur is produced, separating the sulphur and any unreacted residue from the reaction mixture, regenerating the resulting solution, containing at least 1 g/l of cuprous ions and at least 2 g/l of ferrous ions, in situ at atmospheric pressure and at a temperature above 50° C. with air and ferrous chloride at a pH between 1 and 3, whereby goethite is precipitated, separating the goethite from the solution, and isolating an aqueous solution containing said at least one non-ferrous metal chloride.

13. The method of claim 12 wherein the non-ferrous metal is copper; the agent for solubilizing cuprous chloride is ferrous chloride; and the regeneration is conducted at a temperature of from about 93° to about 97° C.

14. The method of claim 12 wherein the lixiviation is carried out at a temperature between 70° C. and 105° C.

15. The method of claim 12 wherein the agent for solubilizing cuprous chloride comprises a chloride ion.

16. The method of claim 12 wherein the agent for solubilizing cuprous chloride is selected from the group consisting of an alkali metal chloride, an alkaline earth metal chloride, ammonium chloride, and ferrous chloride.

17. The method of claim 12 wherein the initial product contains lead sulphide which is converted to the soluble lead chloride by the lixiviation and is present as such in the isolated aqueous solution containing at least one non-ferrous metal chloride, crystallizing the lead chloride, separating the crystallized lead chloride from the aqueous solution, and recovering the lead from the crystallized lead chloride.

18. The method of claim 17 wherein the lead is recovered by reducing the crystallized lead chloride to obtain elemental lead and a regenerating agent as a by-product which is recycled to the lixiviating step.

19. The method of claim 17 wherein the lead is recovered by cementing the crystallized lead chloride with metallic iron to obtain elemental lead and ferrous chloride which is recycled as a regenerating agent to the lixiviating step.

* * * * *